May 7, 1963 R. H. LEE 3,089,075
TRANSISTOR CONVERTERS
Filed May 8, 1958

INVENTOR.
ROBERT H. LEE
BY *Alfred W. Petchaft*
ATT'Y

United States Patent Office 3,089,075
Patented May 7, 1963

3,089,075
TRANSISTOR CONVERTERS
Robert H. Lee, Highland, Ill., assignor to Basler Electric Co., Highland, Ill., a corporation of Illinois
Filed May 8, 1958, Ser. No. 733,975
3 Claims. (Cl. 321—45)

This invention relates in general to converters and, more particularly, to a transistor converter wherein direct current power is converted to alternating current power.

It is a primary object of the present invention to provide a transistor converter which is capable of efficiently driving a load having either a leading or lagging power factor and in which there is relatively little loss of power within the converter.

It is also an object of the present invention to provide a transistor converter of the type stated which is particularly useful in delivering alternating current power at a relatively constant frequency to a load, the impedance of which is a function of frequency.

It is an additional object of the present invention to provide a transistor converter of the type stated wherein the power transistors are protected from damage due to transient voltages in excess of their rated capacity.

With the above and other objects in view, my invention resides in the novel features of form, construction, arrangement, and combination of parts presently described and pointed out in the claims.

In the accompanying drawing—

Figure 1:
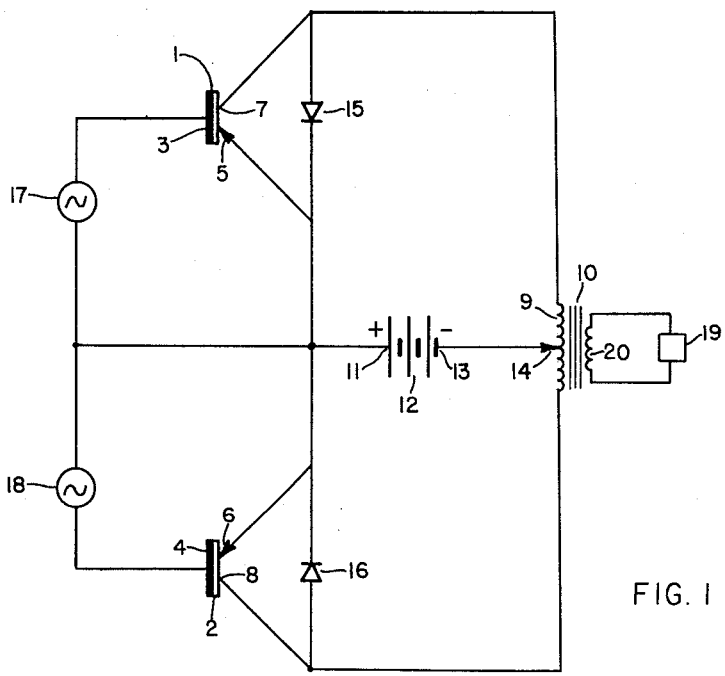
FIG. 1 is a circuit diagram showing a transistor converter constructed in accordance with and embodying the present invention.

Referring now in more detail and by reference characters to the drawing, which illustrates the preferred embodiment of the present invention, FIG. 1 illustrates a transistor converter comprising a pair of power transistors 1, 2, each having bases 3, 4, emitters 5, 6, and collectors 7, 8. The collectors 7, 8 are connected to opposite ends, respectively, of the primary winding 9 of a power transformer 10, and the emitters 5, 6 are connected to the positive terminal 11 of a battery or other suitable source of direct current power 12. The negative terminal 13 of the battery 12 is connected to the center tap 14 of the primary winding 9. Connected across the collector 7 and emitter 5 is a diode 15, and similarly connected across the collector 8 and emitter 6 is a second diode 16. As will be apparent from FIG. 1, the diodes 15, 16, are connected in a current-blocking direction with respect to the normal direction of current flow from the battery 12 through the transistors 1, 2. The transistors 1, 2 are shown as being of the P-N-P type, but it will be apparent that N-P-N transistors can also be used in the present circuit. If this is done, it is merely necessary to reverse the connections of the diodes 15, 16, as well as the connections to the battery 12.

Connected to the bases 3, 4 for supplying switching-signal current thereto are signal generators 17, 18, which alternately bias the transistors 1, 2 to allow or block conduction therethrough. Thus, when the transistor 1 is biased to allow conduction, the transistor 2 is biased to block conduction, and, similarly, when the transistor 2 is biased to allow conduction, the transistor 1 is biased to block conduction. As a result, the transistors 1, 2 are utilized in the switching mode to supply current from the battery 12 alternately to each half of the primary winding 9. The signal generators 17, 18 may be any suitable source of signal, as, for example, a square wave oscillator, in which case the signal generators 17, 18 each represent one-half of the secondary winding of the output transformer of such oscillator with the ends of the secondary winding connected to the bases 3, 4 and the center tap connected to the battery terminal 11.

The load 19 is connected to the secondary winding 20 of the transformer 10, and the load 19 may be any type of resistive or reactive load, but, in most situations, the load will have a power factor since most A.C. loads are not purely resisitive in nature. For example, the load may constitute a motor, the impedance and power factor of which varies according to the mechanical load thereon. The load 19 might also consist of a fluorescent lighting circuit which normally has a relatively low power factor, but such power factor may be either leading or lagging, depending upon the ballast used. However, in power factor loads, a component of current from the load 19 will flow that is not in phase with the load voltage. Therefore, during some time period in each half cycle of operation, a current must flow in a direction opposite to the normal current flow through the transistors. The transistors 1, 2, will, of course, block this reverse flow of current, but the diodes 15, 16, will provide a path through which this reverse current will flow back to and in a direction to charge the battery 12, during a portion of each half cycle of operation.

In connection with the present invention, it has also been found that since it is impossible to provide perfect coupling between the two halves of the primary winding 9, when current flows through one-half of the primary winding 9, and momentarily thereafter the switching circuit provided by the transistors 1, 2 and generators 17, 18 causes current to flow in the other half of the primary winding, the switching is not instantaneous, with the result that the residual current in the one-half of the primary winding 9 will cause transient voltages to build up across the transistor which had been carrying the current during the switching interval. Under certain conditions, these transient voltages might exceed rated voltages and thus damage the transistors 1, 2. However, the diodes 15, 16 provide a current flow path and thus prevent build-up of excess transient voltages across the transistors 1, 2, during the switching interval.

Figure 2:
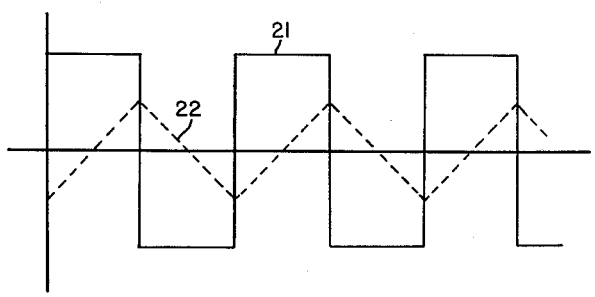
FIG. 2 is a diagram illustrating the wave forms of the voltage across the primary winding of the power transformer of the converter and the current through the load.
Figure 3:
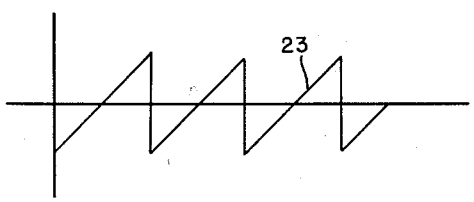
FIG. 3 is a diagram illustrating the current flow through the source of direct current power.

Referring now to FIGS. 2 and 3, FIG. 2 shows a curve 21 which represents the wave form of the voltage across the primary winding 9, while the curve 22 represents the wave form of the current passing through the load 19, assuming the latter is a purely inductive load. Furthermore, in plotting the curves 21, 22, it has been assumed that the load 19 has a lagging power factor, that no power is consumed in the load, and that there are no power losses in the converter. In FIG. 3, the curve 23 shows the wave form of the current flow through the battery 12, also assuming no power losses. It will be seen that the current through the battery is positive for about one-half of the time and negative for the remaining half of the time, thus illustrating that in a power factor load 19, the reverse current passing through the diodes 15, 16, will, during a portion of the cycle, supply current to and charge the battery 12.

It will be apparent that the converter will operate efficiently to drive power factor loads and, due to the presence of the iodes 15, 16, the reverse current reflected back to the primary winding 9 will be usefully employed in returning energy to the battery 12. Converters constructed in accordance with the present invention are particularly useful wherein alternating current power of relatively constant frequency is desired in the load circuit. For example, there are many items of electrical equipment which are designed to operate satisfactorily at a nominal frequency of 60 cycles per second, but ordinarily such equipment will operate within a limited frequency range, such as 50 to 100 cycles per second. However, the converter may be used wherein the desired frequency of operation may vary over a relatively wide range.

It should be understood that changes and modifications in the form, construction, arrangement, and combination of the several parts of the transistor converters may be made and substituted for those herein shown and described without departing from the nature and principle of my invention.

Having thus described my invention, what I claim and desire to secure by Letters Patent is:

1. In combination with a power factor A.C. load, a power supply device for converting direct current to alternating current comprising a direct current source having first and second terminals, a transformer having a primary winding and a secondary winding, said primary winding having two end terminals and an intermediate terminal tapped off between such end terminals whereby to establish a primary circuit having two branches, said intermediate terminal being connected to the first terminal of the direct current source, said secondary winding having output terminals to which the A.C. load is connected so that a component of current from the load which is not in phase with the load voltage will flow alternately in the two branches of the primary circuit, first and second transistors each having a base, a collector and an emitter, two signal generating means each having two terminals, one terminal of one signal generating means being connected to one terminal of the other signal generating means by a common lead which is also connected to the second terminal of the direct current source, the other terminals of the two signal generating means being respectively connected to the bases of the two transistors whereby to alternately bias the transistors so that during one time-interval the first transistor is conducting while the second transistor is non-conducting and during a next succeeding time-interval the second transistor is conducting while the first transistor is non-conducting, the collectors of the two transistors being respectively connected to the end terminals of said primary winding, the emitters of the two transistors both being connected to the common lead between the two signal generating means, a first diode shunted across the collector and emitter of the first transistor and thereby being connected between one end terminal of the primary winding and the second terminal of the direct current source to provide a unidirectional flow-path for transmitting the component of current from the load which flows from such end terminal to the direct current source during the time-interval when the first transistor is non-conducting whereby to return energy to said direct current source during the off-cycle of the first transistor, and a second diode shunted across the collector and emitter of the second transistor and thereby being connected between the other end terminal of the primary winding and the second terminal of the direct current source to provide a unidirectional flow-path for transmitting the component of current from the load which flows from such end terminal to the direct current source during the time-intervals when the first transistor is non-conducting whereby to return energy to said direct current source during the off-cycle of the second transistor.

2. A power supply device for converting direct current to alternating current according to claim 1 in which the intermediate terminal of the primary winding is a center tap which divides the primary into two substanially equal parts.

3. A power supply device for converting direct current to alternating current according to claim 1 in which the direct current source is a battery, the first terminal of such direct current source is negative and the second terminal of such direct current source is positive.

References Cited in the file of this patent

UNITED STATES PATENTS

| | | |
|---|---|---|
| 2,722,649 | Immel et al. | Nov. 11, 1955 |
| 2,783,384 | Bright et al. | Feb. 26, 1957 |
| 2,884,545 | Houck | Apr. 28, 1959 |
| 2,888,622 | Mooers | May 26, 1959 |
| 2,912,634 | Peoples | Nov. 10, 1959 |
| 2,965,833 | Jensen | Dec. 20, 1960 |